(12) United States Patent
Gyllenskog et al.

(10) Patent No.: US 11,704,049 B2
(45) Date of Patent: Jul. 18, 2023

(54) OPTIMIZED COMMAND SEQUENCES

(71) Applicant: Micron Technology, Inc., Boise, ID (US)

(72) Inventors: Christian M. Gyllenskog, Meridian, ID (US); Luca Porzio, Casalnuovo (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/173,519

(22) Filed: Feb. 11, 2021

(65) Prior Publication Data

US 2022/0253232 A1 Aug. 11, 2022

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,977,603 | B2 * | 5/2018 | Porzio | ..................... G06F 13/10 |
| 2009/0300277 | A1 * | 12/2009 | Jeddeloh | ............. G06F 12/0246 |
| | | | | 711/E12.001 |
| 2014/0195764 | A1 * | 7/2014 | Shen | ..................... G06F 3/0673 |
| | | | | 365/230.02 |

* cited by examiner

*Primary Examiner* — Midys Rojas
(74) *Attorney, Agent, or Firm* — Holland & Hart LLP

(57) ABSTRACT

Methods, systems, and devices for optimized command sequences are described. An apparatus includes a memory array and a controller coupled with the memory array. The controller may be configured to receive a first command indicating a start of a sequence of access commands to store at the controller, then receive a first set of access commands associated with the sequence of access commands, and then receive a second command indicating the end of the sequence of access commands. The controller may also receive a second set of access commands after the command. The controller may execute an operation associated with a third set of access commands of the sequence after receiving the second set of access commands and before receiving the third set of access commands based at least in part on identifying the second set of access commands as starting the sequence of access commands.

25 Claims, 8 Drawing Sheets

OPTIMIZED COMMAND SEQUENCES

FIELD OF TECHNOLOGY

The following relates generally to one or more systems for memory and more specifically to optimized command sequences.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
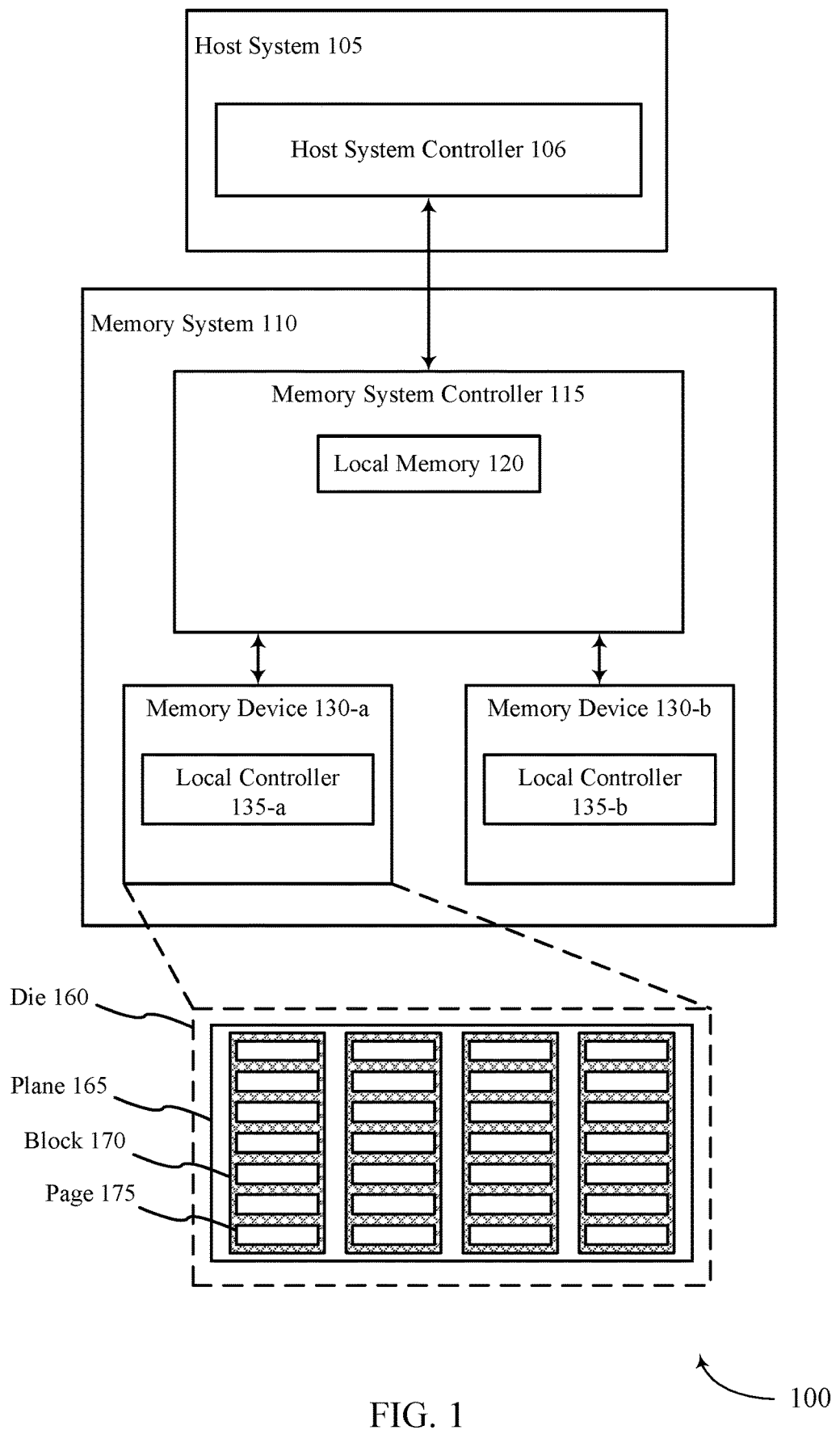
FIG. 1 illustrates an example of a system that supports optimized command sequences in accordance with examples as disclosed herein.

A system may include a host system and a memory system that stores data for the host system. For example, the memory system may include NAND memory cells that store logic state associated with data from the host system. The memory system may perform operations based on commands from the host system. For example, the memory system may perform access operations (e.g., read, write, or refresh operations). In some cases, operations performed by the memory system may be time consuming. For example, in NAND systems, read operations can be time consuming, especially when the operations are performed on non-sequential or random addresses. In such cases, the memory system may consume additional power and bandwidth to perform the read operations. The host system may also transmit sequences of commands to the memory system to perform repeatedly. For example, the host system may send boot sequences. In some cases, the memory system may fail to recognize the incoming commands are a part of a sequence (e.g., a boot sequence) and consume increased power and bandwidth to perform the read operations.

Systems, techniques, and devices are described herein for a host system to indicate a sequence of commands that may be repeated and a memory system to store the sequence based on the indication. By storing the sequences indicated, the memory system may recognize an incoming command or commands as a start of a sequence stored and perform one or more operations to accelerate an execution of the sequence of commands based on the recognition. For example, the memory system may pre-read certain memory locations, pre-load a portion of a logical-to-physical (L2P) table for addresses that are part of the sequence, or perform operations related to power control (e.g., transitioning to a sleep or standby power state) based on recognizing the sequence and knowing when operations associated with the sequence occur in the stored sequence. Additionally or alternatively, the memory system may re-arrange data (e.g., transfer data from one location to another) to allow for more efficient performance of the sequence of commands. For example, the memory system may transfer data associated with the sequence to different planes of a NAND memory die such that multiple commands of the sequence may be executed concurrently using multi-plane reads. The memory system may also transfer data associated with the sequence to locations that can be accessed sequentially as the sequence of commands is performed—e.g., the memory system may transfer the data to physically contiguous memory locations. By optimizing the sequences of commands (e.g., commands sequences), the memory system may execute the commands sequences in shorter durations and reduce power consumption and bandwidth.

Features of the disclosure are initially described in the context of systems, devices, and circuits as described with reference to FIGS. 1 and 2. Features of the disclosure are described in the context process flow as described with reference to FIGS. 3 and 4. These and other features of the disclosure are further illustrated by and described with reference to an apparatus diagram and flowcharts that relate to optimized command sequences as described with reference to FIGS. 5-8.

FIG. 1 illustrates an example of a system 100 that supports optimized command sequences in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB)

flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA)controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache or buffer for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support optimized command sequences. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the host system 105 may transmit certain command sequences (e.g., a sequence of commands, sequence of access commands) repeatedly to the memory device. If the sequence of commands includes random or non-sequential addresses, execution of the sequence of commands may span a time period given by independent execution of each command. Thus, the power and bandwidth consumed by the sequence of commands may be high relative to operations associated with the sequence that could be combined or optimized.

As described herein, the host system 105 may program a command sequence to the memory system 110. By storing the command sequence, the memory system 110 may perform the sequence in an optimized manner. For example, the memory system may determine a set of incoming access commands as starting a stored sequence. The memory system 110 may pre-read certain memory locations, fetch portions of the L2P table, and perform operations related to power control based on determining the start of the sequence. Additionally or alternatively, the memory system 110 may rearrange the data to reduce non-sequential or random address. Accordingly, the memory system may perform operations associated with the sequence faster, reduce power consumption, and reduce latency.

Figure 2:
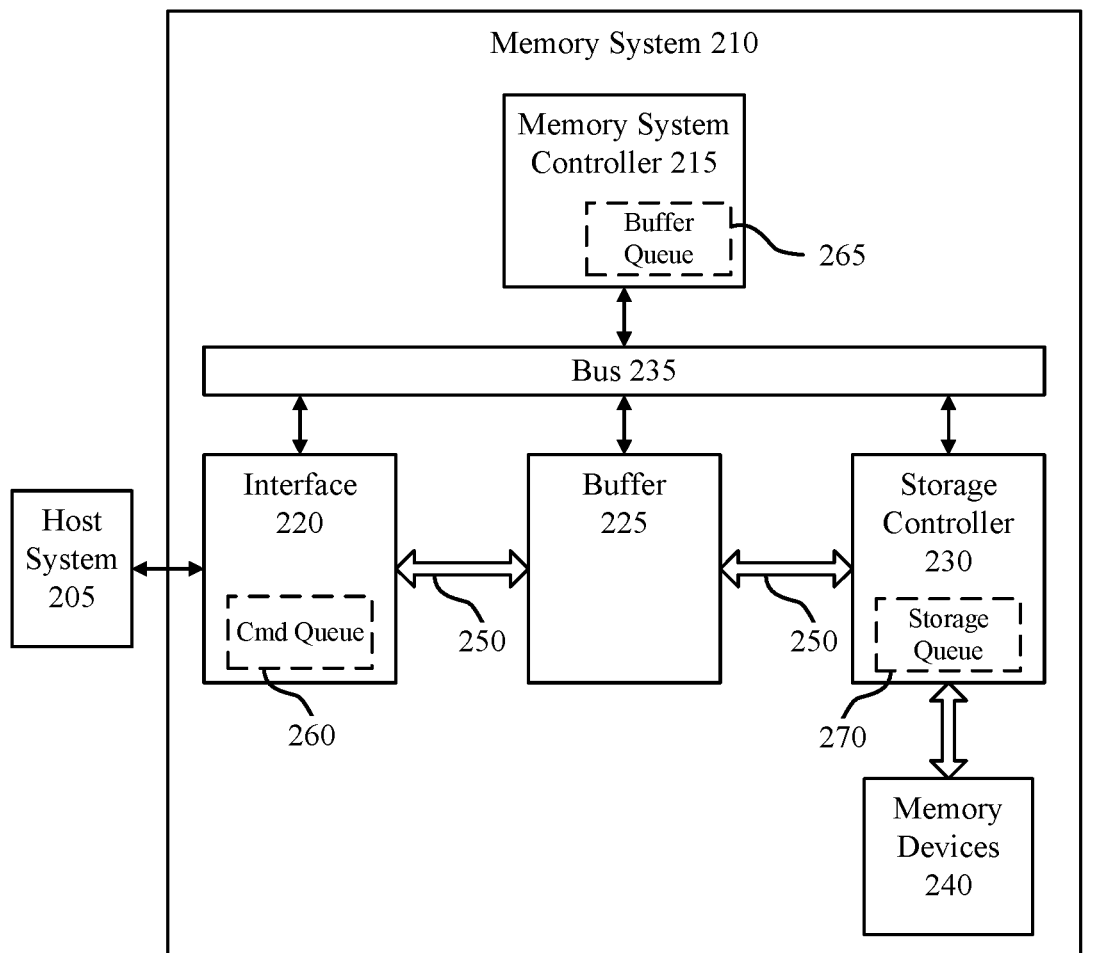
FIG. 2 illustrates an example of a system that supports optimized command sequences in accordance with examples as disclosed herein.

FIG. 2 illustrates an example of a system 200 that supports optimized command sequences in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, OxRAM, or random access memory (RAM) memory, such as dynamic RAM (DRAM) memory or synchronous DRAM (SDRAM) memory. In some examples, the NAND memory may be configured to perform non-sequential or random (e.g., scattered) read operations slower than other types of memory devices (e.g., slower than RAM, FERAM, MRAM, DRAM, or 3D cross point). Accordingly, the memory system 210 may rearrange data associated with a sequence to one or more of the RAM, FERAM, MRAM, DRAM, or 3D cross point memory. In such examples, the memory system 210 may execute an access operation associated with the sequence faster due to the data associated with the random or non-sequential read being in a memory that executes the operation faster than the NAND memory. The memory listed here only examples and are not limiting on the claims. The memory system 210 may include other types of memory as well.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation). In some examples, the buffer 225 may store data associated with a pre-read operation executed while the memory system 210 optimizes a command sequence. For example, the memory system 210 may determine a set of incoming access commands as starting a sequence stored at the memory system controller 215. The memory system 210 may then execute pre-read operations associated with remaining access commands in the sequence, before receiving the remaining access commands. For example, the memory system 210 may receive a first set of commands associated with a start of the sequence. The memory system 210 may then perform a pre-read operation on data associated with a second set of commands in the sequence, before the second set of commands are received by the memory system 210. The memory system 210 may then utilize the buffer 225 to store the data until the second set of commands are received by the memory system 210 from the host system 205.

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the host system 205 may transmit a command to the memory system controller 215 that indicates a start of a sequence the memory system 210 is to store. The host system 205 may determine to program the sequence to the memory system 210 based on repeatedly sending the sequence to the memory system 210. For example, the host system 205 may frequently launch an app that has the same sequence of commands each time it is launched. The host system 205 may program the sequence so that the memory system 210 may execute the sequence (e.g., launch the app) faster or more efficiently. The memory system controller 215 may store each access command received after the first command. The host system 205 may then transmit a second command to indicate the end of the sequence. In some examples, the memory system controller 215 may rearrange the data associated with the sequence to enable the memory system 210 to execute the sequence faster. For example, the memory system controller 215 may transfer data such that it can be read concurrently or sequentially. The memory system controller 215 may also move data from a first memory type to a second memory type that executes the operation associated with the sequence faster than the first memory type.

The memory system controller 215 may receive additional access commands from the host system 205 after storing the sequences. When the memory system controller 215 recognizes the incoming access commands as starting a sequence stored in the memory system 210, the memory system controller 215 may fetch portions of an L2P table associated with the sequence. The memory system controller 215 may also perform pre-read operations (e.g., perform operations before the corresponding access command in the sequence is received) and store the data in the buffer. The memory system controller 215 may also control the power states of the memory system 210 based on storing the sequence. By optimizing the sequence (e.g., by rearranging data, performing pre-reads, fetching L2P table portions, and controlling the power states) the memory system 210 may reduce power consumption, bandwidth, and latencies in the system.

Figure 3:
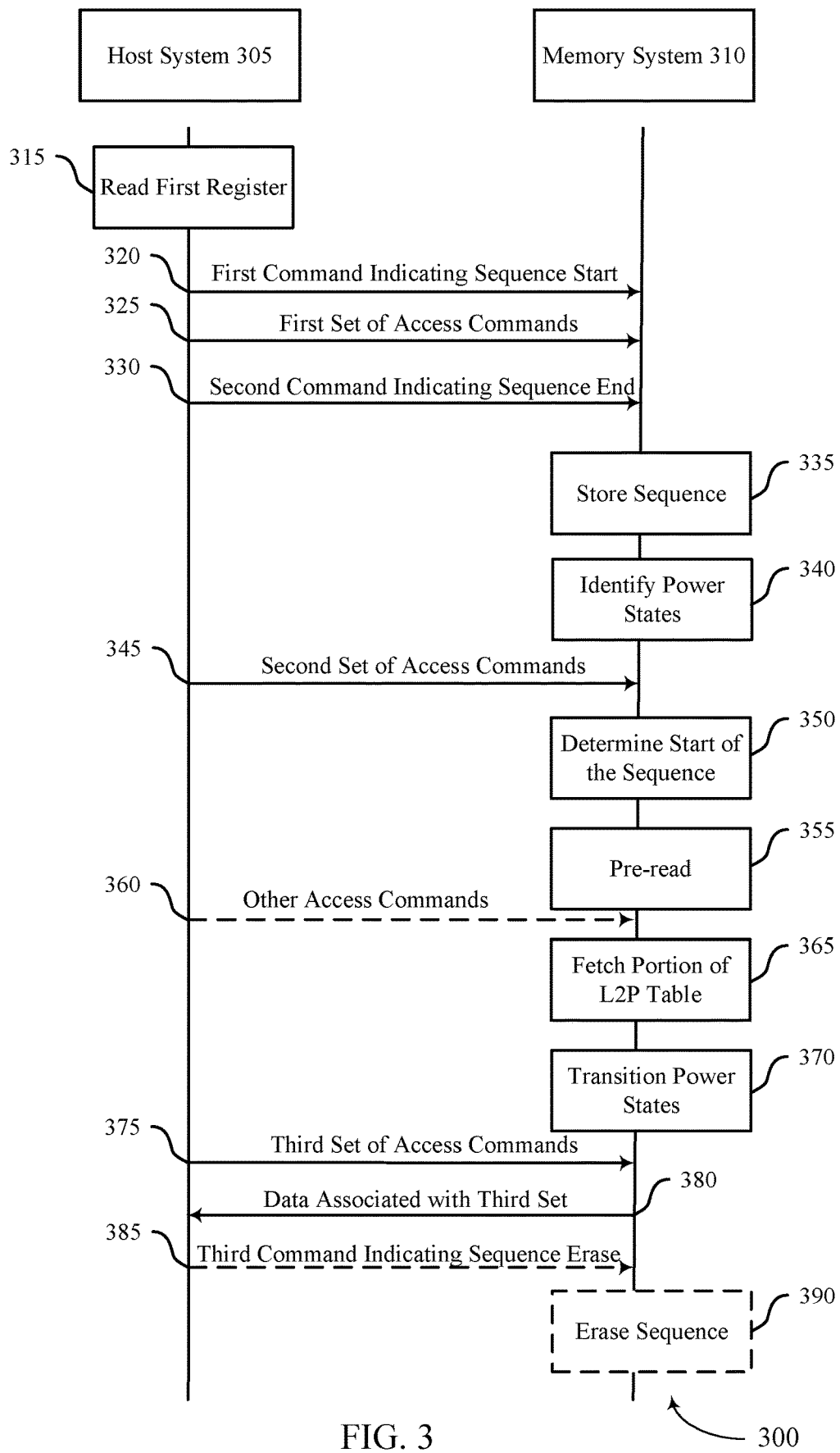
FIG. 3 illustrates an example of a process flow that supports optimized command sequences in accordance with examples as disclosed herein.

FIG. 3 illustrates an example of a process flow 300 that supports optimized command sequences in accordance with examples as disclosed herein. Process flow 300 may include a host device 305 and a memory device 310, which may be respective examples of a host device 105 and a memory device 110 as described with reference to FIG. 1. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. The process flow 300 illustrates examples for optimizing host system command sequences received at a memory system to reduce bandwidth, power consumption, and durations of operations associated with the sequence.

At 315, a first register is read. For example, a host system 305 (e.g., host system 105 as described with reference to FIG. 1) may read a first register at a memory system 310 (e.g., memory system 110 as described with reference to FIG. 1). In some examples, a memory system 310 may store a sequence (e.g., command sequence, sequence of commands, sequence of access commands) in response to a command issued by the host system 305. That is, the host system 305 may transmit certain sequences of commands repeatedly (e.g., a boot sequence). In such examples, the host system 305 may indicate to the memory system 310 to record and track the commands issued in the sequence so that the memory system 310 may optimize the sequence when subsequently issued by the host system 305. In some cases, the memory system 310 may include a first register that stores a first value indicating the quantity of sequences stored at the memory system 310. In some cases, the first register may be in the memory system controller (e.g., memory system controller 115 as described with reference to FIG. 1). The first register may also be configured to store a second value indicating the maximum quantity of sequences the memory system 310 is configured to store—e.g., the first register may indicate the memory system 310 can store 64 sequences. The second value may be set for the memory system 310 during a manufacturing process. In some examples, the host system 305 may read the first value to determine a quantity of sequences of stored at the memory system 310. The host system 305 may also compare the first value indicating the quantity of sequences stored at the memory system 310 with the second value indicating the maximum quantity of sequences storable. If the host system 305 determines the first value is less than the second value, the host system 305 may proceed to 320. If the host system 305 determines the first value is equal to the second value, the host system 305 may proceed to 375.

A host system 305 may initiate storing of a sequence of commands by sending a first command 320 to the memory system. For example, the memory system 310 may receive the first command 320 indicating a start of a sequence of commands from the host system 305. The first command 320 can be received at the memory system controller. In some examples, the host system 305 may determine a sequence frequently transmitted to the memory system 310 should be stored at the memory system 310. In such examples, the host system 305 may transmit a first command 320 that indicates a beginning of a sequence of commands the memory system 310 will store. The host system 305 may include a sequence index in the first command 320—e.g., an index of the sequence to be programmed (stored) at the memory system 310.

Subsequently, a first set of access commands 325 may be received by the memory system 310. For example, the memory system 310 may receive the first set of access commands 325 from the host system 305. The first set of access commands 325 can be received at the memory system controller. In some examples, the first set of access commands 325 may include read commands associated with read operations to be executed at the memory system 310. In some cases, the memory system 310 may record or store each command (e.g., the command and logical address associated with the command) received from the host system 305 in the first set of commands. In some cases, the memory system 310 may record or store a subset of the first set of access commands 325 (e.g., may not store certain commands such as write commands). Additionally, the memory system 310 may execute each command received from host system 305 while concurrently storing the command as well.

The host system 310 may send a second command 330 to the memory system 310. For example, the memory system 310 may receive a second command 330 indicating an end to the sequence from the host system 305. The second command 330 may be received at the memory system controller. In some examples, after the host system 305 has transmitted all access commands associated with a sequence, the host system 305 may transmit the second command 330 to the memory system 310. The memory system 310 may stop recording or storing access commands from the host system 305 based on receiving the second command 330.

At 335, the sequence may be stored. For example, the memory system 310 may store the sequence received from the host system 305. The sequence may be stored at the memory system controller. In some examples, the sequence may be stored at a second register based on receiving the first set of access commands 325—e.g., the first set of access commands 325 may be associated with the sequence. In some examples, the memory system 310 may also store a third value indicating a quantity of operations in the sequence (e.g., a quantity of commands received in the first set of access commands 325). In some examples, the memory system 310 may perform step 335 concurrently with receiving the first set of access commands 325. That is, the memory system 310 may store the access commands (e.g., command type and logical address) associated with the sequence as the memory system 310 receives those access commands. In some examples, the memory system controller may also update the first value in the first register that indicates the quantity of sequences stored. For example, the memory system controller may update the first value from 24 to 25 if there were 24 sequences stored before receiving the first command 320 from the host system 305.

At 340, power states may be identified. For example, the memory system 310 may identify the power states at the memory system controller. In some examples, the memory system 310 may also identify power states associated with the sequence based on the first set of access commands 325 received. For example, the memory system controller may identify a first power state for the memory system 310 between receiving a first access command of the first set of access commands 325 and a second access command of the first set of access of commands 325. In some cases, the memory system controller may identify the power state based on a duration between the first access command and the second access command. For example, the memory system controller may determine the second access command is received from the host system 305 after a relatively long duration. Accordingly, the memory system controller may identify that for that duration the memory system 310 can enter a standby or sleep mode to conserve power consumption. In other examples, the memory system controller may identify a first power state based on a different factor—e.g., amount of resources consumed or clock cycles. The memory system 310 may store the power state information along with the sequence—e.g., store the power states in the second register.

Subsequently, second set of access commands 345 may be received. For example, the memory system 310 may receive the second set of access commands 345 from the host system 305. The second set of access commands 345 may be received at the memory system controller. In some examples, the second set of access commands 345 may include a quantity of access commands less than a quantity of access commands in the first set of access commands.

At 350, a start of the sequence may be determined. For example, the memory system 305 may determine the start of the sequence. The determination may be made at the memory system controller. In some examples, the memory system controller may determine the start of the sequence by comparing the second set of access commands with all stored sequences—e.g., by comparing each command with the beginning commands of each stored sequence. In some examples, the memory system controller may also compare the addresses (e.g., logical addresses) received in each command with the addresses stored in the first command of each of the stored sequences to identify the start of a sequence matching one of the stored sequences. In other examples, the memory system controller may determine the start of the sequence by starting an operation and determining the operation is associated with a stored sequence (e.g., a boot operation). For example, the memory system controller may determine the second set of access commands match the beginning commands of the first set of access commands. In such examples, the memory system controller may determine the host system 305 is starting the sequence associated with the first set of access commands and start performing optimization techniques as described at 355, 365, and 375. It should be noted the memory system 310 may perform any combination of the optimization techniques (including all three) in any given order or concurrently.

At 355, a pre-read may be performed. For example, a memory system 310 may perform a pre-read operation. The pre-read operation may be performed by the memory system controller. In some examples, the memory system controller may begin pre-read operations based on determining the second set of access commands is the start of a sequence stored at the memory system. In such examples, the memory system controller may perform an operation (e.g., a read operation) associated with a command in the first set of commands not yet received in the second set of access commands. That is, the memory system may perform operations of the sequence before receiving the corresponding access command from the host system 305 based on determining the second set of access commands starts the sequence. In some examples, the memory system controller may read data associated with the pre-read operations into a buffer or cache until the corresponding access command from the host system 305 is received.

At 360, other access commands may be received. For example, the memory system 310 may receive other access commands unrelated to the sequence from the host system 305. The other access commands may be received at the memory system controller. In some examples, the memory system controller may receive access commands unassociated with any sequences while performing the pre-read operations or one of the other optimization techniques at 365 or 370. In such examples, the memory system 310 may continue performing the optimization techniques in conjunction with executing the other access commands received. In some cases, the memory system 310 may store data associated with the pre-read operations in the buffer while also performing operations associated with other access commands received. For example, the memory system may perform a pre-read operation and read the data to the buffer while also performing a read operation associated with the other access commands and transmitting data associated with the other access commands back to the host system 305. The memory system 310 may also recognize when incoming commands are part of the sequence and when they are other access commands (e.g., miscellaneous commands). That is, receiving other access commands does not disrupt the execution of the sequence.

At 365, a portion of a logic-to-physical (L2P) table may be fetched. For example, the memory system 310 may fetch the portion of the L2P table. The portion may be fetched at the memory system controller. In some examples, to optimize the execution of the sequence, the memory system 310 may fetch the portion of the L2P table associated with access commands of the sequence before the corresponding access command is received from the host system 305. For example, the memory system 310 may fetch the portion of the L2P table associated with an operation and access command from the first set of access commands and the stored sequence that has not yet been transmitted by the host system 305 in the second set of access commands—e.g., the access command associated with the portion of the L2P table may be received with a third set of access commands at 375. In some examples, fetching the portion of the L2P table may enable the memory system 310 to more quickly access data at the physical locations associated with the subsequent logical addresses received from the host system 305 at 375.

At 370, a transition of a power state may occur. For example, the memory system 310 may transition from a second power state to the first power state. The transition may be initiated by the memory system controller. In some examples, the memory system controller may transition from a second power state (e.g., active or normal power during an operation) to the first power state (e.g., standby or sleep) based on determining the second set of access commands starts the sequence. For example, the memory system controller may receive a third access command that corresponds to (e.g., is the same as) the first access command of the first set of access commands. After receiving the third access command, the memory system controller may transition the memory system 310 to the first power state identified at 340. Subsequently, the memory system controller may receive a fourth access command corresponding to the second access command of the first set of access commands and transition the memory system 310 back to the second power state. By transitioning the power state to the first power state based on the cycles of the sequence, the memory system 310 may reduce power consumption.

At 375, a third set of access commands may be received. For example, the memory system 310 may receive the third set of access commands from the host system 305. The third set of access commands may be received at the memory system controller. In some examples, the host system 305 may transmit the third set of access commands associated with the rest of the sequence.

At 380, data associated with the third set of access commands may be transmitted. For example, the memory system 310 may transmit the data to the host system 305. The data may be transmitted by the memory system controller. In some examples, the memory system 310 may transmit the data associated with the third set of access based on receiving the third set of access commands from the host system 305. In some cases, the memory system 310 may transmit some of the data from the buffer to the host system 310 based on the pre-read operations. In other cases, the memory system 310 may perform read operations in a relatively faster duration based on fetching the portion of the L2P before receiving the third set of access commands. By implementing these optimization techniques, the memory system 310 may execute the operations of the stored sequence faster than the operations associated with the first set of access commands. That is, the memory system 310 may execute the first set of access commands in a first duration and execute the second set and third set of access commands in a second duration that is less than the first duration based on the optimization of the sequence (e.g., the pre-read and L2P fetch). This may enable the memory system 310 to reduce bandwidth and increase the overall performance of the system (e.g., system 100 as described with reference to FIG. 1).

At 385, a third command may be received. For example, the memory system 310 may receive the third command indicating an erase of a sequence from the host system 305. The third set of access commands may be received at the memory system controller. In some examples, the host system 305 may erase a sequence stored at the memory system 310. For example, the host system 305 may transmit the third command when the memory system 350 has stored the maximum quantity of sequences indicated by the second value in the first register. In other examples, the host system 305 may determine a sequence is no longer repeatedly used and transmits the third command to free additional space in the memory system 310.

At 390, a sequence may be erased. For example, the memory system 310 may erase the sequence indicated in the third command from the host system 305. The erase operation may be initiated by the memory system controller. In some examples, the memory system 310 may also update the first value in the first register indicating the quantity of sequences stored in the memory system controller. For example, the memory system 310 may update the value from 24 to 23 based on receiving the third command and having 24 sequences stored in the memory system controller prior to receiving the third command.

Figure 4:
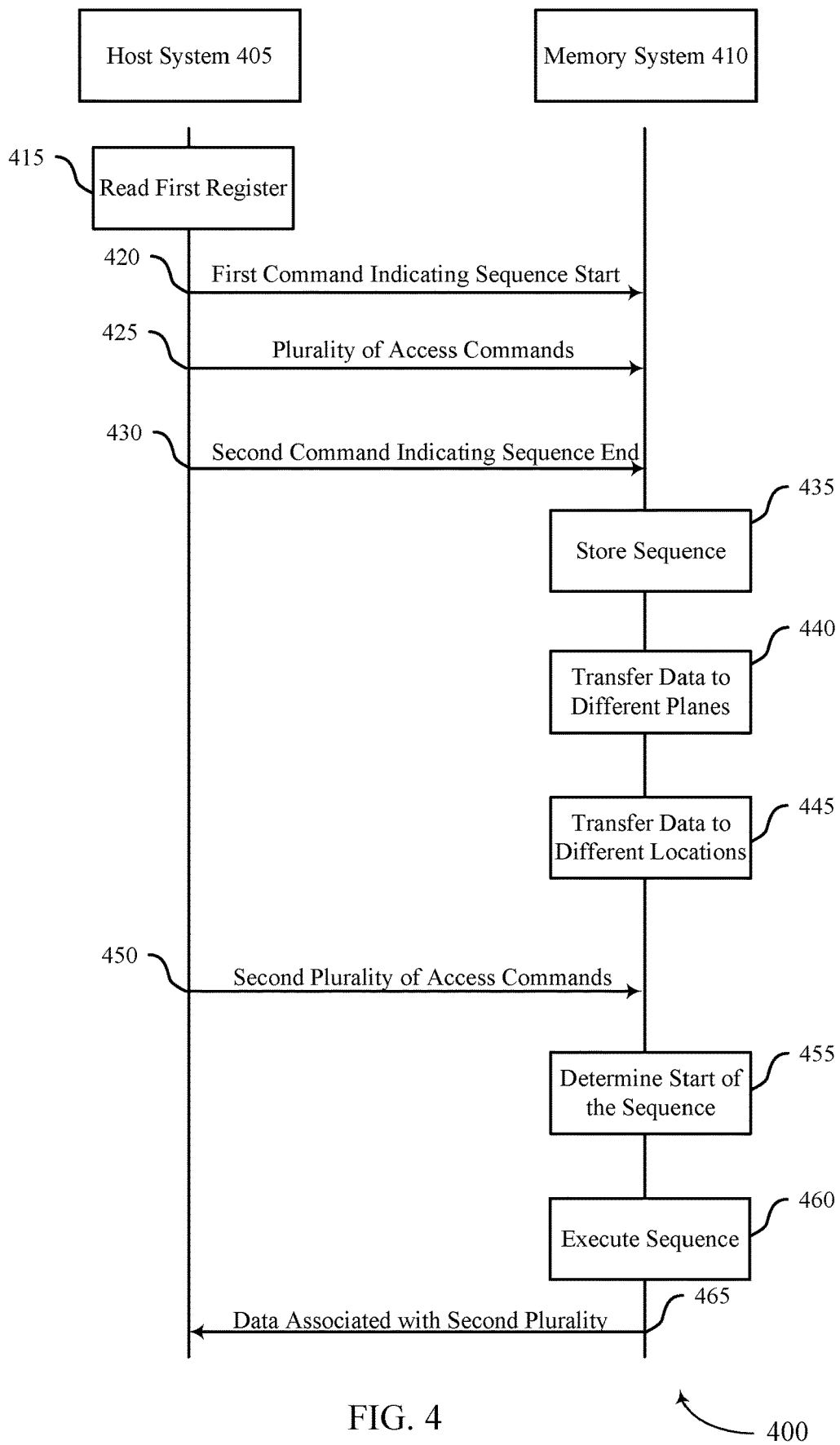
FIG. 4 illustrates an example of a process flow that supports optimized command sequences in accordance with examples as disclosed herein.

FIG. 4 illustrates an example of a process flow 400 that supports optimized command sequences in accordance with examples as disclosed herein. Process flow 400 may include a host device 405 and a memory device 410, which may be respective examples of a host device 105 and a memory device 110 as described with reference to FIG. 1. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. The process flow 400 illustrates examples for optimizing host system command sequences received at a memory system to reduce bandwidth, power consumption, and durations of operations associated with the sequence.

At 415 a first register may be read. For example, host system 405 may read a first register stored at a memory system 410. As described with reference to FIG. 3, the host system 405 may program command sequences to the memory system 410. The memory system 410 may store the sequences in the first register to indicate to the host system 405 a quantity of sequences stored. The host system 405 may determine if the memory system 410 is available to store another sequence before transmitting a first command. If the host system 405 determines the quantity of sequences stored is the same as the maximum quantity of sequences storable, the host system 405 may transmit an erase command and have the memory system 410 erase a sequence as described with reference to FIG. 3.

A first command 420 may be sent from the host system 405 to the memory system 410. For example, the memory system 410 may receive the first command 420 indicating a start of a sequence of commands from the host system 305. The first command 420 can be received at the memory system controller. In some examples, the host system 405 may determine a sequence frequently transmitted to the memory system 310 should be stored at the memory system 310. In such examples, the host system 405 may transmit the first command 420 to indicate the start of the sequence.

Subsequently, a plurality of access commands 425 may be received by the memory system 410. For example, the memory system 410 may receive the plurality of access commands 425 from the host system 405. The plurality of access commands 425 can be received at the memory system controller. In some examples, the memory system 410 may execute and store each command received in the plurality of access commands 425 from the host system 405 as described with reference to FIG. 3.

The host system 405 may send a second command 430 to the memory system 410. For example, the memory system 410 may receive a second command 430 indicating an end to the sequence from the host system 405. The second command 430 may be received at the memory system controller. In some examples, after the host system 405 has transmitted the plurality of access commands 425 associated with a sequence, the host system 405 may transmit the second command 430 to the memory system 410. The memory system 410 may stop recording or storing access commands from the host system 405 based on receiving the second command 430.

At 435, the sequence may be stored. For example, the memory system 410 may store the sequence received from the host system 405. The sequence may be stored at the memory system controller. As described with reference to FIG. 3, the memory system 410 may store the sequence and update a register value indicating the quantity of sequences stored at the memory system 410.

At 440, data (e.g., data accessed in the plurality of access commands 425) may be transferred to different planes within one or more memory devices (e.g., memory die). For example, the memory system 410 may transfer data from a first plane (e.g., first location) to a second plane (e.g., a second location) in a same or different memory die. The transfer may be initiated by the memory system controller. In some examples, the memory system 410 may be configured to perform multi-plane reads concurrently. That is, a page in a first plane may be read concurrently with a page in a second plane. In some examples, the memory system 410 may include six (6) planes and accordingly perform a concurrent operation at a page of each plane—e.g., the memory system 410 may perform six (6) concurrent read operations. In some cases, the multi-plane read operation may be a quickest read operation the memory system 410 may perform. Accordingly, the memory system 410 may transfer data associated with the sequence (e.g., data associated with a first command and a second command of the plurality of access commands) to different pages of different planes such that some commands of the sequence may be performed concurrently. For example, the memory system 410 may rearrange data associated with a first through sixth access command of the sequence to a different page across six (6) planes such that the first through sixth access commands may be executed concurrently. By transferring the data, the memory system 410 may be able to execute some access commands of the sequence concurrently, enabling the memory system 410 to execute the sequence faster. The memory system 410 may execute the data transfer during a garbage collection operation or other idle periods.

At 445, data (e.g., data accessed in the plurality of access commands 425) may be transferred to a different location. For example, the memory system 410 may transfer data a first location to a second location. The data transfer may be initiated by the memory system controller. In some examples, the memory system 410 may include NAND memory cells. In such examples, the memory system 410 may be configured to perform sequential read operations (e.g., read operations at physically contiguous locations) faster than random read operations. (e.g., scattered read operations, read operations across random pages of a plane). Accordingly, the memory system 410 may transfer some data associated with the sequence (e.g., data associated with the second command of the plurality of access commands) from a first location to a second location that is physically contiguous with a location storing data associated with the first access command of the plurality of access commands. In other examples, the memory system 410 may include multiple types of memory cells. For examples, the memory system 410 may include 3-dimensional Xpoint (3DXP) memory, ferroelectric RAM (FeRAM), phase change memory (PCM), magnetoresistive RAM (MRAM), self-selecting memory, NOR (e.g., NOR flash) memory, Spin Transfer Torque (STT)-MRAM, conductive bridging RAM (CBRAM), resistive random access memory (RRAM), oxide based RRAM (OxRAM), or random access memory (RAM) memory cells, such as dynamic RAM (DRAM) memory cells or synchronous DRAM (SDRAM) memory cells. In some examples, these memory cells may be configured to perform random read (or scattered) access operations with reduced latency relative to NAND memory cells. Accordingly, the memory system 410 may transfer data associated with a random read operation from NAND memory cells to the memory cells with reduced random read latencies. In still other examples, the memory system 410 may include multiple types of NAND memory cells—e.g., single-level cells (SLCs) configured to store one bit of information in each cell or multi-level cells (MLCs) configured to each store two or more bits of information. MLCs may include, for example, tri-level cells (TLCs) configured to each store three bits of information, quad-level cells (QLCs) configured to each store four bits of information, or cells configured to store more than four bits of information. In some examples, multiple-level memory cells may be slower at executing an access operation than a single level cell. Accordingly, the memory system 410 may transfer data associated with the sequence from a multiple-level memory cell to a single level cell. By transferring the data to a second location, the memory system 410 may accelerate the execution of operations associated with the sequence.

A second plurality of access commands 450 may be received. For example, the memory system 410 may receive the second plurality of access commands 450 from the host system 405. The second plurality of access commands 450 may be received at the memory system controller. In some examples, the second plurality of access commands 450 may be associated with the sequence. In other examples, the second plurality of access commands 450 may be a portion of the sequence stored—e.g., a quantity of the second plurality of access commands 450 may be less than a quantity of the first plurality of access commands.

At 455, a start of a sequence may be determined. For example, the memory system 410 may determine the start of the sequence based on the second plurality of access commands received from the host system 405. The second command may be received at the memory system controller. As described with reference to FIG. 3, the memory system controller may determine the start of the sequence by comparing the second plurality of commands with access commands in stored sequences, compare addresses of the second plurality of commands with addresses in stored sequences, or by determining the start of an operation associated with stored sequences.

At 460, a sequence may be executed. For example, the memory system 410 may execute the sequence. The execution of the sequence may be initiated by the memory system controller. In some examples, the memory system 410 may execute the sequence using the techniques described with reference to FIG. 3 (e.g., at 355, 365, 370). Additionally or alternatively, the memory system 410 may also execute some access commands of the second plurality of access commands concurrently or sequentially based on transferring the data to different planes or locations (e.g., as described at 440 or 445). For example, the memory system 410 may receive a first access command and a second access command of the second plurality of access commands associated with data stored at a first page of a first plane and a second page of a second plane based on transferring the data. The memory system 410 may execute the first access command and the second access command concurrently. The memory system 410 may also receive a third access command of the second plurality of access commands associated with a third location that is physically contiguous with the first page or second page based on transferring the data. Accordingly, the memory system 410 may execute the third command sequentially after the first and second access commands. By using the optimization techniques or by transferring the data, the memory system 410 may execute the second plurality of access commands faster, reducing power consumption, bandwidth, and latencies. In some cases, the memory system 410 may execute the second plurality of access commands faster or more efficiently without determining the start of the sequence at 445 (e.g., transferring the data between planes or locations may inherently provide the advantages for the sequence without recognizing the sequence or performing any additional optimization such as pre-reading or preloading the L2P table.

At 465, data may be transmitted. For example, the memory system 410 may transmit data associated with the second plurality of access commands (e.g., the sequence) to the host system 405. The data transmission may be initiated by the memory system controller. In some examples, the host system 405 may receive the data faster based on the optimization of the execution of the sequence.

Figure 5:
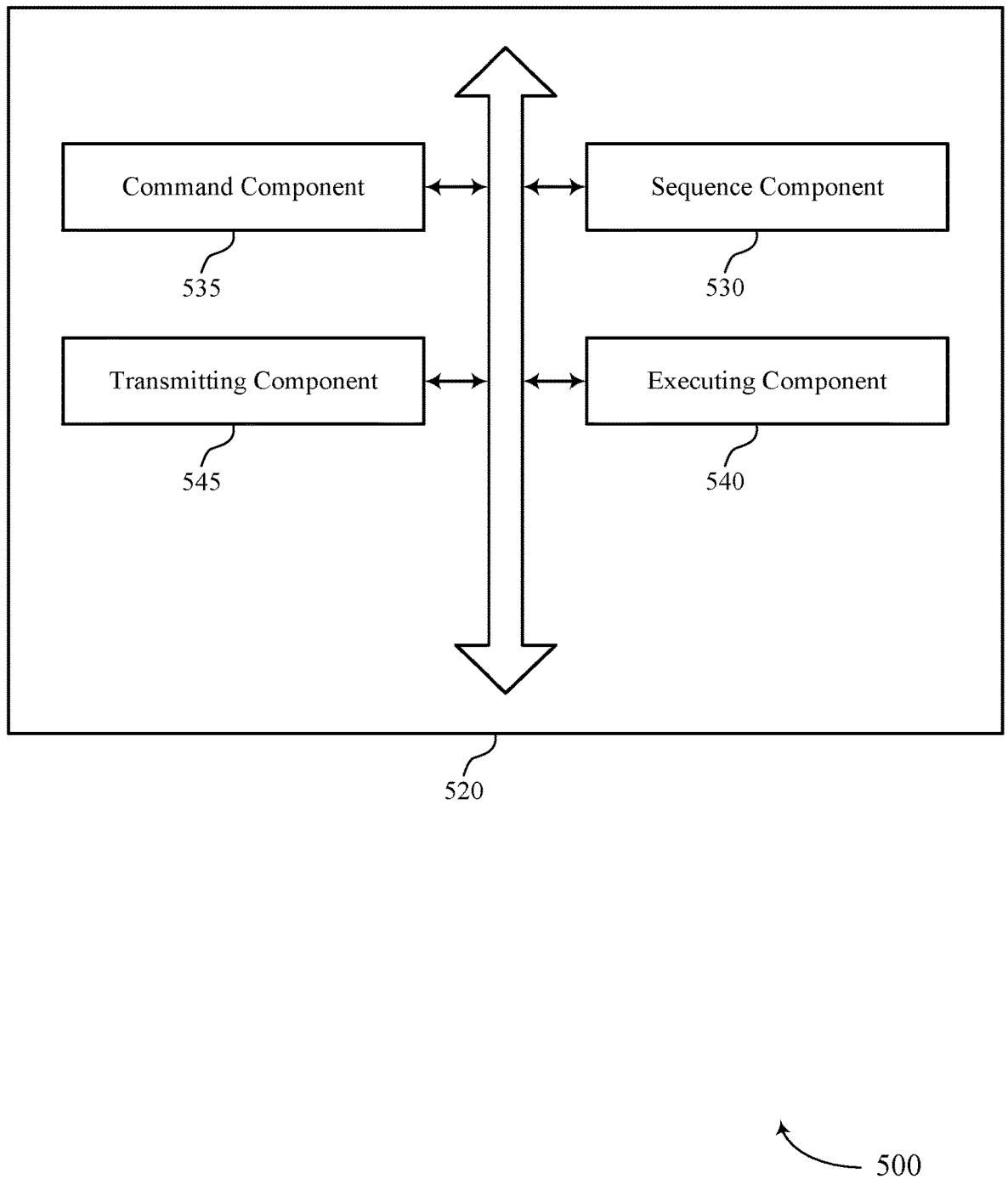
FIG. 5 shows a block diagram of a managed memory system controller that supports optimized command sequences in accordance with examples as disclosed herein.

FIG. 5 shows a block diagram 500 of a managed memory system controller 520 that supports optimized command sequences in accordance with examples as disclosed herein. The managed memory system controller 520 may be an example of aspects of a managed memory system controller as described with reference to FIGS. 1 through 4. The managed memory system controller 520, or various components thereof, may be an example of means for performing various aspects of optimized command sequences as described herein. For example, the managed memory system controller 520 may include a sequence component 530, a command component 535, an executing component 540, a transmitting component 545, or any combination thereof. Each of these components may communicate, directly or indirectly, with one another (e.g., via one or more buses).

The sequence component 530 may be configured as or otherwise support a means for receiving, at a controller, a first command indicating a start of a sequence of access commands to store at the controller. In some examples, the sequence component 530 may be configured as or otherwise support a means for receiving, at the controller, a second command indicating an end of the sequence of access commands after receiving the first set of access commands. In some cases, the sequence component 530 may be configured as or otherwise support a means for comparing the second set of access commands with the first set of access commands of the sequence, where identifying the second set of access commands as starting the sequence is based at least in part on the comparison.

In some instances, the sequence component 530 may be configured as or otherwise support a means for receiving a third command associated with erasing the sequence stored at the controller. In some cases, the sequence component 530 may be configured as or otherwise support a means for identifying a first power state for a memory array coupled with the controller between a first access command of the first set of access commands and a second access command of the first set of access commands based at least in part on receiving the first set of access commands. In some examples, the sequence component 530 may be configured as or otherwise support a means for identifying a third access command of the second set of access commands corresponding to the first access command of the first set of access commands based at least in part on storing the sequence and receiving the second set of access commands.

The command component 535 may be configured as or otherwise support a means for receiving, at the controller, a first set of access commands after receiving the first command, the first set of commands associated with the sequence of access commands. In some cases, the command component 535 may be configured as or otherwise support a means for receiving, at the controller, a second set of access commands after receiving the second command. In some instances, the command component 535 may be configured as or otherwise support a means for receiving the third set of access commands after executing the operation.

The executing component 540 may be configured as or otherwise support a means for executing an operation associated with a third set of access commands of the sequence after receiving the second set of access commands and before receiving the third set of access commands based at least in part on identifying the second set of access commands as starting the sequence of access commands. In some examples, the executing component 540 may be configured as or otherwise support a means for fetching a portion of a logical to physical table associated with logical addresses accessed by the sequence before receiving the third set of access commands based at least in part on identifying the second set of access commands.

In some cases, the executing component 540 may be configured as or otherwise support a means for erasing the sequence at the controller based at least in part on receiving the third command. In some instances, the executing component 540 may be configured as or otherwise support a means for updating a value in a register from a first value to a second value based at least in part on erasing the sequence, the value indicating a quantity of sequences stored at the controller.

In some examples, the executing component 540 may be configured as or otherwise support a means for determining a start of a second operation, the second operation associated with the sequence, where identifying the second set of access commands as starting the sequence is based at least in part on the determination. In some examples, the executing component 540 may be configured as or otherwise support a means for updating a value in a register from a first value to a second value based at least in part on storing the sequence, where the value indicates a quantity of sequences stored at the controller. In some instances, the executing component 540 may be configured as or otherwise support a means for setting a value in a register before receiving the first command, the value indicating a quantity of sequences storable at the controller.

In some examples, the executing component 540 may be configured as or otherwise support a means for storing the first power state with the sequence based at least in part on identifying the first power state. In some examples, the executing component 540 may be configured as or otherwise support a means for transitioning from a second power state to the first power state based at least in part on identifying the third access command corresponding to the first access command.

In some cases, the transmitting component 545 may be configured as or otherwise support a means for transmitting data associated with one or more of the third set of access commands, where the operation includes performing a portion of read operations associated with the one or more of the third set of access commands prior to receiving the one or more of the third set of access commands.

Figure 6:
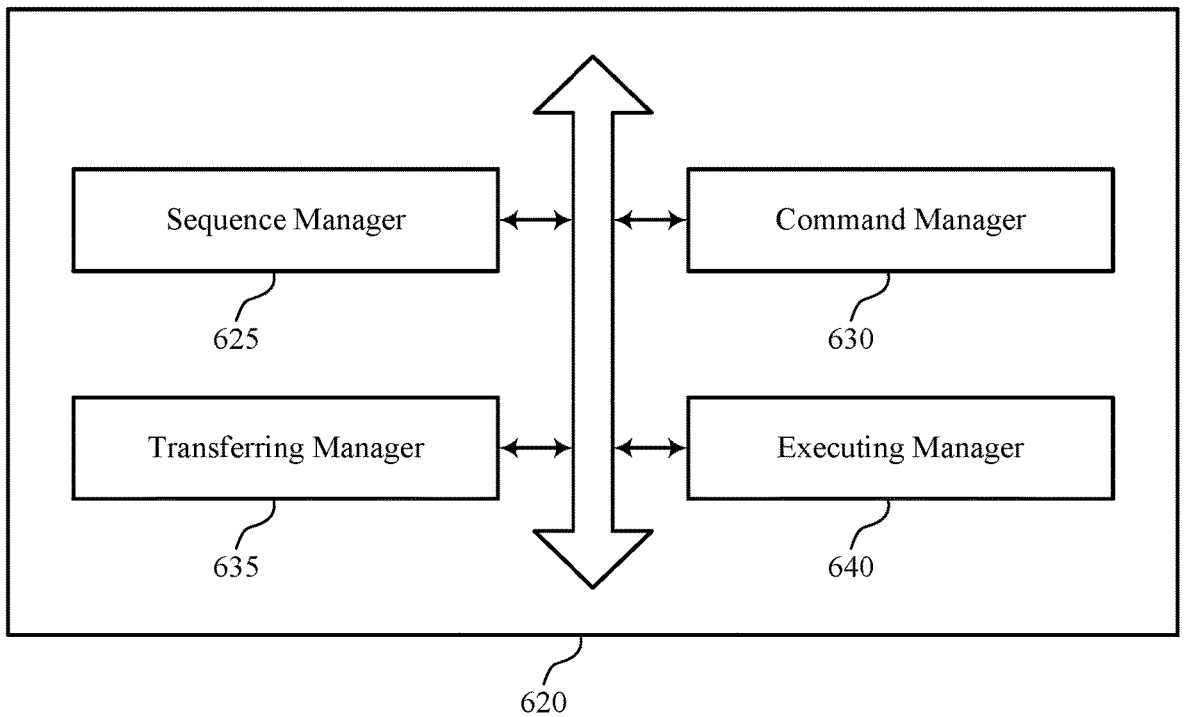
FIG. 6 shows a block diagram of a memory system controller that supports optimized command sequences in accordance with examples as disclosed herein.

FIG. 6 shows a block diagram 600 of a managed memory system controller 620 that supports optimized command sequences in accordance with examples as disclosed herein. The managed memory system controller 620 may be an example of aspects of a managed memory system controller as described with reference to FIGS. 1 through 4. The managed memory system controller 620, or various components thereof, may be an example of means for performing various aspects of optimized command sequences as described herein. For example, the managed memory system controller 620 may include a sequence manager 625, a command manager 630, a transferring manager 635, an executing manager 640, or any combination thereof. Each of these components may communicate, directly or indirectly, with one another (e.g., via one or more buses).

The sequence manager 625 may be configured as or otherwise support a means for receiving, at a controller coupled with a memory array including a plurality of memory cells, a first command indicating a start of a sequence of access commands to store at the controller, where the sequence is associated with a set of data. The command manager 630 may be configured as or otherwise support a means for receiving a plurality of access commands after receiving the first command, the plurality of access commands associated with the sequence and the plurality of access commands including an access command associated with a first portion of the set of data and an access command associated with a second portion of the set of data. In some examples, the sequence manager 625 may be configured as or otherwise support a means for receiving a second command indicating an end of the sequence after receiving the plurality of access commands. The transferring manager 635 may be configured as or otherwise support a means for transferring the first portion of the set of data from a first location to a second location based at least in part on receiving the second command, where, at the second location, an operation associated with the access command associated with the first portion of the set of data is executed concurrently with an operation associated with the access command associated with the second portion of the set of data.

In some examples, the command manager 630 may be configured as or otherwise support a means for receiving a second plurality of access commands after transferring the first portion of the set of data to the second location, the second plurality of access commands including a first access command associated with the first portion of the set of data and a second access command associated with the second portion of the set of data.

In some examples, the executing manager 640 may be configured as or otherwise support a means for executing the second plurality of access commands at the first location and the second location based at least in part on receiving the second plurality of access commands, where the second plurality of access commands are associated with the sequence, and where an operation for the first access command and an operation for the second access command are executed concurrently.

In some examples, the executing manager 640 may be configured to execute as read operations based on receiving the operation for the first access command and the operation for the second access command. In some examples, the executing manager 640 may be configured to execute a read operation concurrently from the memory array on first portion of the set of data and the second portion of the set of data.

In some examples, the second plurality of access commands further includes a third access command associated with an operation on a third location, and the executing manager 640 may be configured as or otherwise support a means for executing the operation associated with the third location sequentially after executing the first access command and the second access command concurrently based at least in part on transferring the first portion of the set of data to the second location.

Figure 7:
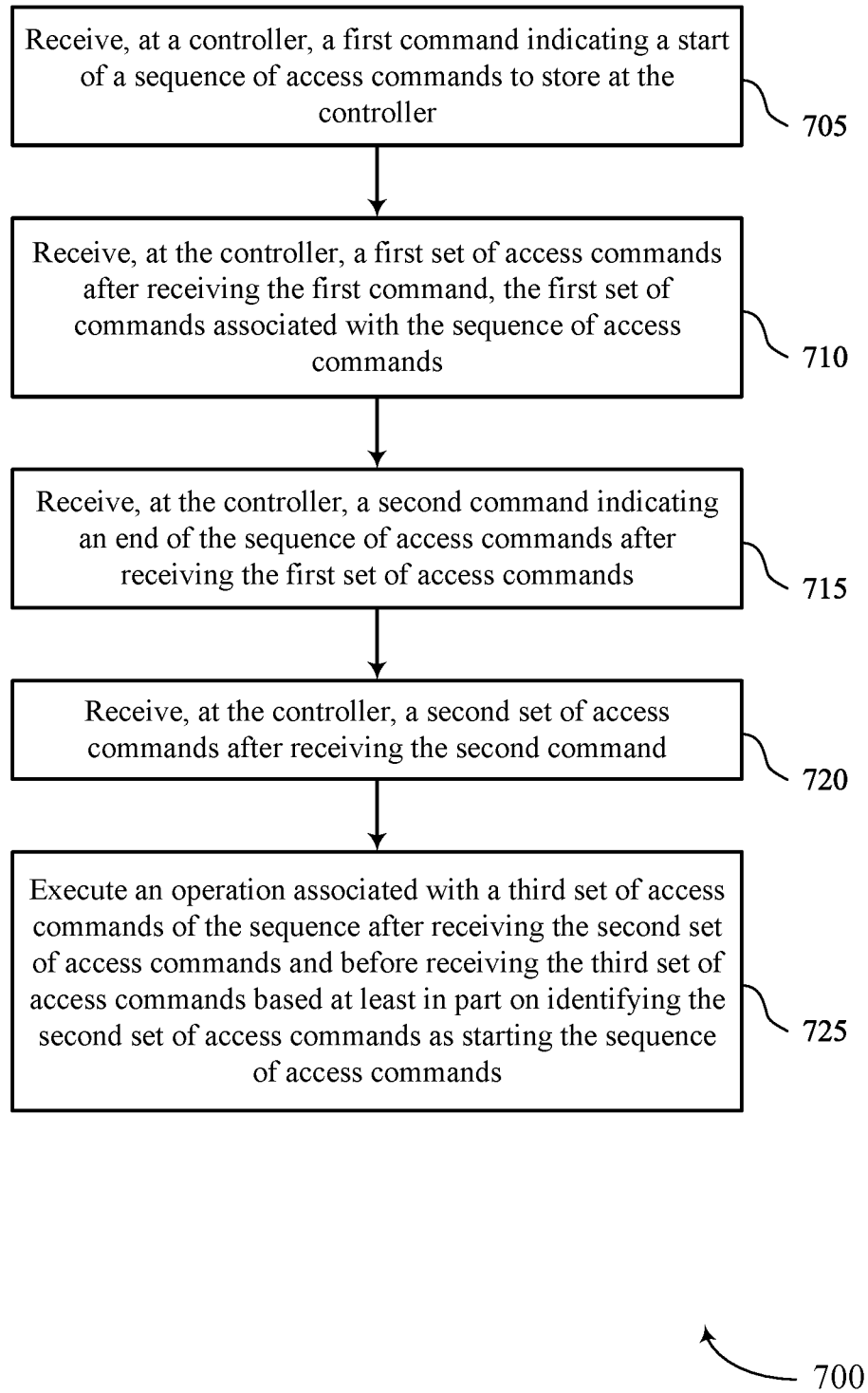
FIGS. 7 and 8 show flowcharts illustrating a method or methods that support optimized command sequences in accordance with examples as disclosed herein.

FIG. 7 shows a flowchart illustrating a method 700 that supports optimized command sequences in accordance with examples as disclosed herein. The operations of method 700 may be implemented by a managed memory system controller or its components as described herein. For example, the operations of method 700 may be performed by a managed memory system controller as described with reference to FIGS. 1 through 5. In some examples, a managed memory system controller may execute a set of instructions to control the functional elements of the device to perform the described functions. Additionally or alternatively, the managed memory system controller may perform aspects of the described functions using special-purpose hardware.

At 705, the method may include receiving, at a controller, a first command indicating a start of a sequence of access commands to store at the controller. The operations of 705 may be performed in accordance with examples as disclosed herein. In some examples, aspects of the operations of 705 may be performed by a sequence component 530 as described with reference to FIG. 5.

At 710, the method may include receiving, at the controller, a first set of access commands after receiving the first command, the first set of commands associated with the sequence of access commands. The operations of 710 may be performed in accordance with examples as disclosed herein. In some examples, aspects of the operations of 710 may be performed by a command component 535 as described with reference to FIG. 5.

At 715, the method may include receiving, at the controller, a second command indicating an end of the sequence of access commands after receiving the first set of access commands. The operations of 715 may be performed in accordance with examples as disclosed herein. In some examples, aspects of the operations of 715 may be performed by a sequence component 530 as described with reference to FIG. 5.

At 720, the method may include receiving, at the controller, a second set of access commands after receiving the second command. The operations of 720 may be performed in accordance with examples as disclosed herein. In some examples, aspects of the operations of 720 may be performed by a command component 535 as described with reference to FIG. 5.

At 725, the method may include executing an operation associated with a third set of access commands of the sequence after receiving the second set of access commands and before receiving the third set of access commands based at least in part on identifying the second set of access commands as starting the sequence of access commands. The operations of 725 may be performed in accordance with examples as disclosed herein. In some examples, aspects of the operations of 725 may be performed by an executing component 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, at a controller, a first command indicating a start of a sequence of access commands to store at the controller, receiving, at the controller, a first set of access commands after receiving the first command, the first set of commands associated with the sequence of access commands, receiving, at the controller, a second command indicating an end of the sequence of access commands after receiving the first set of access commands, receiving, at the controller, a second set of access commands after receiving the second command, and executing an operation associated with a third set of access commands of the sequence after receiving the second set of access commands and before receiving the third set of access commands based at least in part on identifying the second set of access commands as starting the sequence of access commands.

Some examples of the method 700 and the apparatus described herein may further include operations, features, circuitry, logic, means, or instructions for receiving the third set of access commands after executing the operation and transmitting data associated with one or more of the third set of access commands, where the operation includes performing a portion of read operations associated with the one or more of the third set of access commands prior to receiving the one or more of the third set of access commands.

Some instances of the method 700 and the apparatus described herein may further include operations, features, circuitry, logic, means, or instructions for fetching a portion of a logical to physical table associated with logical addresses accessed by the sequence before receiving the third set of access commands based at least in part on identifying the second set of access commands.

Some cases of the method 700 and the apparatus described herein may further include operations, features, circuitry, logic, means, or instructions for comparing the second set of access commands with the first set of access commands of the sequence, where identifying the second set of access commands as starting the sequence may be based at least in part on the comparison.

Some instances of the method 700 and the apparatus described herein may further include operations, features, circuitry, logic, means, or instructions for determining a start of a second operation, the second operation associated with the sequence, where identifying the second set of access commands as starting the sequence may be based at least in part on the determination.

Some cases of the method 700 and the apparatus described herein may further include operations, features, circuitry, logic, means, or instructions for updating a value in a register from a first value to a second value based at least in part on storing the sequence, where the value indicates a quantity of sequences stored at the controller.

Some instances of the method 700 and the apparatus described herein may further include operations, features, circuitry, logic, means, or instructions for setting a value in a register before receiving the first command, the value indicating a quantity of sequences storable at the controller.

Some examples of the method 700 and the apparatus described herein may further include operations, features, circuitry, logic, means, or instructions for receiving a third command associated with erasing the sequence stored at the controller, erasing the sequence at the controller based at least in part on receiving the third command, and updating a value in a register from a first value to a second value based at least in part on erasing the sequence, the value indicating a quantity of sequences stored at the controller.

Some cases of the method 700 and the apparatus described herein may further include operations, features, circuitry, logic, means, or instructions for identifying a first power state for a memory array coupled with the controller between a first access command of the first set of access commands and a second access command of the first set of access commands based at least in part on receiving the first set of access commands and storing the first power state with the sequence based at least in part on identifying the first power state.

Some instances of the method 700 and the apparatus described herein may further include operations, features, circuitry, logic, means, or instructions for identifying a third access command of the second set of access commands corresponding to the first access command of the first set of access commands based at least in part on storing the sequence and receiving the second set of access commands and transitioning from a second power state to the first power state based at least in part on identifying the third access command corresponding to the first access command.

Figure 8:
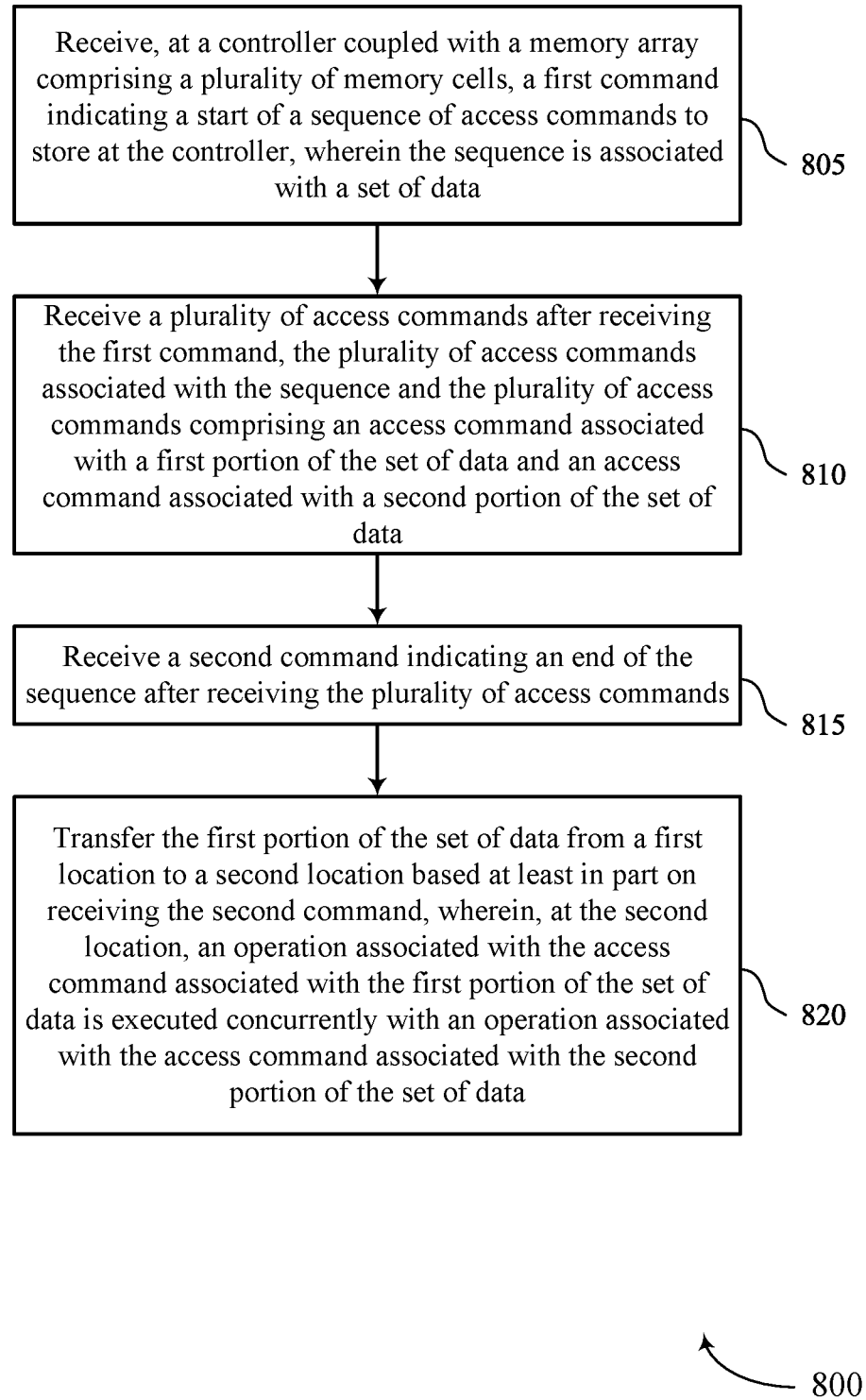

FIG. 8 shows a flowchart illustrating a method 800 that supports optimized command sequences in accordance with examples as disclosed herein. The operations of method 800 may be implemented by a managed memory system controller or its components as described herein. For example, the operations of method 800 may be performed by a managed memory system controller as described with reference to FIGS. 1 through 4 and 6. In some examples, a managed memory system controller may execute a set of instructions to control the functional elements of the device to perform the described functions. Additionally or alternatively, the managed memory system controller may perform aspects of the described functions using special-purpose hardware.

At 805, the method may include receiving, at a controller coupled with a memory array including a plurality of memory cells, a first command indicating a start of a sequence of access commands to store at the controller, where the sequence is associated with a set of data. The operations of 805 may be performed in accordance with examples as disclosed herein. In some examples, aspects of the operations of 805 may be performed by a sequence manager 625 as described with reference to FIG. 6.

At 810, the method may include receiving a plurality of access commands after receiving the first command, the plurality of access commands associated with the sequence and the plurality of access commands including an access command associated with a first portion of the set of data and an access command associated with a second portion of the set of data. The operations of 810 may be performed in accordance with examples as disclosed herein. In some examples, aspects of the operations of 810 may be performed by a command manager 630 as described with reference to FIG. 6.

At 815, the method may include receiving a second command indicating an end of the sequence after receiving the plurality of access commands. The operations of 815 may be performed in accordance with examples as disclosed herein. In some examples, aspects of the operations of 815 may be performed by a sequence manager 625 as described with reference to FIG. 6.

At 820, the method may include transferring the first portion of the set of data from a first location to a second location based at least in part on receiving the second command, where, at the second location, an operation associated with the access command associated with the first portion of the set of data is executed concurrently with an operation associated with the access command associated with the second portion of the set of data. The operations of 820 may be performed in accordance with examples as disclosed herein. In some examples, aspects of the operations of 820 may be performed by a transferring manager 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving, at a controller coupled with a memory array including a plurality of memory cells, a first command indicating a start of a sequence of access commands to store at the controller, where the sequence is associated with a set of data, receiving a plurality of access commands after receiving the first command, the plurality of access commands associated with the sequence and the plurality of access commands including an access command associated with a first portion of the set of data and an access command associated with a second portion of the set of data, receiving a second command indicating an end of the sequence after receiving the plurality of access commands, and transferring the first portion of the set of data from a first location to a second location based at least in part on receiving the second command, where, at the second location, an operation associated with the access command associated with the first portion of the set of data is executed concurrently with an operation associated with the access command associated with the second portion of the set of data.

Some instances of the method 800 and the apparatus described herein may further include operations, features, circuitry, logic, means, or instructions for receiving a second plurality of access commands after transferring the first portion of the set of data to the second location, the second plurality of access commands including a first access command associated with the first portion of the set of data and a second access command associated with the second portion of the set of data and executing the second plurality of access commands at the first location and the second location based at least in part on receiving the second plurality of access commands, where the second plurality of access commands may be associated with the sequence, and where an operation for the first access command and an operation for the second access command may be executed concurrently.

In some cases of the method 800 and the apparatus described herein, the operation for the first access command and the operation for the second access command include read operations, and the first portion of the set of data and the second portion of the set of data may be read concurrently from the memory array.

In some cases of the method 800 and the apparatus described herein, the second plurality of access commands further includes a third access command associated with an operation on a third location and the method, apparatuses, and non-transitory computer-readable medium may include further operations, features, circuitry, logic, means, or instructions for executing the operation associated with the third location sequentially after executing the first access command and the second access command concurrently based at least in part on transferring the first portion of the set of data to the second location.

In some instances of the method 800 and the apparatus described herein, a first plane of the memory array includes a first plurality of pages, the first plane associated with the first location and a third location storing the second portion of the set of data and a second plane of the memory array includes a second plurality of pages, the second plane associated with the second location, where a first page of the first plurality of pages and a second page of the second plurality of pages may be configured to execute the operation associated with the first location concurrently with the operation associated with the second location.

In some examples of the method 800 and the apparatus described herein, the first location may be associated with a first type of memory cell and the second location may be associated with a second type of memory cell.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array including a plurality of memory cells and a controller coupled with the memory array and configured to receive a first command indicating a start of a sequence of access commands to store at the controller, receive a first set of access commands after receiving the first command, the first set of access commands associated with the sequence of access commands, receive a second command indicating an end of the sequence of access commands after receiving the first set of access commands, receive a second set of access commands after receiving the second command, and execute an operation associated with a third set of access commands of the sequence after receiving the second set of access commands and before receiving the third set of access commands based at least in part on identifying the second set of access commands as starting the sequence of access commands In some examples, the controller may also be configured to receive the third set of access commands after executing the operation and transmit data associated with one or more of the third set of access commands, where the operation includes performing a portion of read operations associated with the one or more of the third set of access commands prior to receiving the one or more of the third set of access commands.

In some cases, the controller may also be configured to fetch a portion of a logical to physical table associated with logical addresses accessed by the sequence before receiving the third set of access commands based at least in part on identifying the second set of access commands.

In some instances, the controller may also be configured to compare the second set of access commands with the first set of access commands of the sequence, where the controller may be configured to identify the second set of access commands as starting the sequence based at least in part on the comparison.

In some examples, controller may also be configured to determine a start of a second operation, the second operation associated with the sequence, where the controller may be configured to identify the second set of access commands as starting the sequence based at least in part on the determination.

In some cases, the controller may also be configured to update a value in a register from a first value to a second value based at least in part on storing the sequence, where the value indicates a quantity of sequences stored at the controller.

In some instances, the controller may also be configured to set a value in a register before receiving the first command, the value indicating a quantity of sequences storable at the controller.

In some examples, the controller may also be configured to receive a third command associated with erasing the sequence stored at the controller, erase the sequence at the controller based at least in part on receiving the third command, and update a value in a register from a first value to a second value based at least in part on erasing the sequence, the value indicating a quantity of sequences stored at the controller.

In some cases, the controller may also be configured to identify a first power state for the apparatus between a first access command of the first set of access commands and a second access command of the first set of access commands based at least in part on receiving the first set of access commands and store the first power state with the sequence based at least in part on identifying the first power state.

In some instances, the controller may also be configured to identify a third access command of the second set of access commands corresponding to the first access command of the first set of access commands based at least in part on storing the sequence and receiving the second set of access commands and transition from a second power state to the first power state based at least in part on identifying the third access command corresponding to the first access command.

Another apparatus is described. The apparatus may include a memory array including a plurality of memory cells and a controller coupled with the memory array and configured to receive a first command indicating a start of a sequence of access commands to store at the controller, where the sequence is associated with a set of data, receive a plurality of access commands after receiving the first command, the plurality of access commands associated with the sequence and the plurality of access commands including an access command associated with a first portion of the set of data and an access command associated with a second portion of the set of data, receive a second command indicating an end of the sequence after receiving the plurality of access commands, and transfer the first portion of the set of data from a first location to a second location based at least in part on receiving the second command, where, at the second location, an operation associated with the access command associated with the first portion of the set of data is executed concurrently with an operation associated with the access command associated with the second portion of the set of data In some examples, the controller may also be configured to receive a second plurality of access commands after transferring the first portion of the set of data to the second location, the second plurality of access commands including a first access command associated with the first portion of the set of data and a second access command associated with the second portion of the set of data and execute the second plurality of access commands at the first location and the second location based at least in part on receiving the second plurality of access commands, where the second plurality of access commands may be associated with the sequence, and where an operation for the first access command and an operation for the second access command may be executed concurrently.

In some examples of the apparatus, the operation for the first access command and the operation for the second access command include read operations, and the first portion of the set of data and the second portion of the set of data may be read concurrently from the memory array.

In some examples, the controller may also be configured to execute the operation associated with the third location sequentially after executing the first access command and the second access command concurrently based at least in part on transferring the first portion of the set of data to the second location.

In some examples of the apparatus, the memory array further includes a first plane including a first plurality of pages, the first plane associated with the first location and a third location storing the second portion of the set of data and a second plane including a second plurality of pages, the second plane associated with the second location, where a first page of the first plurality of pages and a second page of the second plurality of pages may be configured to execute the operation associated with the first location concurrently with the operation associated with the second location.

In some examples of the apparatus, the first location may be associated with a first type of memory cell and the second location may be associated with a second type of memory cell.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory array comprising a plurality of memory cells; and
a controller coupled with the memory array and configured to:
receive a first command indicating a start of a first instance of a sequence of access commands to store at the controller;
receive a set of access commands after receiving the first command, the set of access commands associated with the first instance of the sequence of access commands;
receive a second command indicating an end of the first instance of the sequence of access commands after receiving the set of access commands;
receive a first portion of the set of access commands after receiving the second command, the first portion of the set of access commands corresponding to a second instance of the sequence of access commands; and
execute an operation associated with a second portion of the set of access commands after receiving the first portion of the set of access commands and before receiving the second portion of the set of access commands corresponding to the second instance of the sequence of access commands based at least in part on identifying the receipt of the first portion of the set of access commands as starting the second instance of the sequence of access commands.

2. The apparatus of claim 1, wherein the controller is further configured to:
receive the second portion of the set of access commands after executing the operation; and
transmit data associated with one or more access commands of the second portion of the set of access commands, wherein the operation comprises performing a portion of read operations associated with the one or more access commands of the second portion of the set of access commands prior to receiving the one or more access commands of the second portion of the set of access commands.

3. The apparatus of claim 1, wherein to execute the operation the controller is further configured to:
fetch a portion of a logical to physical table associated with logical addresses accessed by the sequence before receiving the second portion of the set of access commands based at least in part on identifying the receipt of the first portion of the set of access commands as starting the second instance of the sequence of access commands.

4. The apparatus of claim 1, wherein the controller is further configured to:
compare the first portion of the second set of access commands of the second instance of the sequence with the set of access commands of the first instance of the sequence, wherein the controller is configured to identify the first portion of the set of access commands as starting the second instance of the sequence based at least in part on the comparison.

5. The apparatus of claim 1, wherein the controller is further configured to:
determine a start of a second operation, the second operation associated with second instance of the sequence, wherein the controller is configured to identify the first portion of the set of access commands as starting the second instance of the sequence based at least in part on the determination.

6. The apparatus of claim 1, wherein the controller is further configured to:
update a value in a register from a first value to a second value based at least in part on storing the sequence, wherein the value indicates a quantity of sequences stored at the controller.

7. The apparatus of claim 1, wherein the controller is further configured to:
set a value in a register before receiving the first command, the value indicating a quantity of sequences storable at the controller.

8. The apparatus of claim 1, wherein the controller is further configured to:

receive a third command associated with erasing the sequence stored at the controller;

erase the sequence at the controller based at least in part on receiving the third command; and update a value in a register from a first value to a second value based at least in part on erasing the sequence, the value indicating a quantity of sequences stored at the controller.

9. The apparatus of claim 1, wherein the controller is further configured to:

identify a first power state for the apparatus between a first access command of the set of access commands and a second access command of the set of access commands based at least in part on receiving the set of access commands; and store the first power state with the sequence based at least in part on identifying the first power state.

10. The apparatus of claim 9, wherein the controller is further configured to:

identify a third access command of the first portion of the set of access commands corresponding to the first access command of the set of access commands based at least in part on storing the sequence and receiving the first portion of the set of access commands; and transition from a second power state to the first power state based at least in part on identifying the third access command corresponding to the first access command.

11. An apparatus, comprising:

a memory array comprising a plurality of memory cells; and a controller coupled with the memory array and configured to:

receive a first command indicating a start of a first instance of a sequence of access commands to store at the controller, wherein the sequence is associated with a set of data;

receive a plurality of access commands after receiving the first command, the plurality of access commands associated with the first instance of the sequence and the plurality of access commands comprising an access command associated with a first portion of the set of data and an access command associated with a second portion of the set of data, wherein the first instance of the sequence of access commands comprises the plurality of access commands;

receive a second command indicating an end of the first instance of the sequence after receiving the plurality of access commands; and transfer the first portion of the set of data from a first location to a second location based at least in part on receiving the second command, wherein, at the second location, an operation associated with the access command associated with the first portion of the set of data is executed concurrently with an operation associated with the access command associated with the second portion of the set of data.

12. The apparatus of claim 11, wherein the controller is further configured to:

receive a second plurality of access commands after transferring the first portion of the set of data to the second location, the second plurality of access commands comprising a first access command associated with the first portion of the set of data and a second access command associated with the second portion of the set of data; and execute the second plurality of access commands at the first location and the second location based at least in part on receiving the second plurality of access commands, wherein the second plurality of access commands are associated with a second instance of the sequence, and wherein an operation for the first access command and an operation for the second access command are executed concurrently.

13. The apparatus of claim 12, wherein:

the operation for the first access command and the operation for the second access command comprise read operations; and the first portion of the set of data and the second portion of the set of data are read concurrently from the memory array.

14. The apparatus of claim 12, wherein the second plurality of access commands further comprises a third access command associated with an operation on a third location, and wherein the controller is further configured to:

execute the operation associated with the third location sequentially after executing the first access command and the second access command concurrently based at least in part on transferring the first portion of the set of data to the second location.

15. The apparatus of claim 11, wherein the memory array further comprises:

a first plane comprising a first plurality of pages, the first plane associated with the first location and a third location storing the second portion of the set of data; and a second plane comprising a second plurality of pages, the second plane associated with the second location, wherein a first page of the first plurality of pages and a second page of the second plurality of pages are configured to execute the operation associated with the first location concurrently with the operation associated with the second location.

16. The apparatus of claim 11, wherein:

the first location is associated with a first type of memory cell; and the second location is associated with a second type of memory cell.

17. A non-transitory computer-readable medium storing code comprising instructions, which when executed by a processor of an electronic device, cause the electronic device to:

receive, at a controller, a first command indicating a start of a first instance of a sequence of access commands to store at the controller;

receive a set of access commands after receiving the first command, the set of access commands associated with the first instance of the sequence of access commands;

receive a second command indicating an end of the first instance of the sequence of access commands after receiving the set of access commands;

receive a first portion of the set of access commands after receiving the second command, the first portion of the set of access commands corresponding to a second instance of the sequence of access commands; and execute an operation associated with a second portion of the set of of access commands after receiving the first portion of the set of access commands and before receiving the second portion of the set of access commands corresponding to the second instance of the sequence of access commands based at least in part on identifying the receipt of the first portion of the set of access commands as starting the second instance of the sequence of access commands.

18. The non-transitory computer-readable medium of claim 17, wherein the instructions, when executed by the processor of the electronic device, further cause the electronic device to:
receive the second portion of the set of access commands after executing the operation; and
transmit data associated with one or more access commands of the second portion of the set of access commands, wherein the operation comprises performing a portion of read operations associated with the one or more access commands of the second portion of the set of access commands prior to receiving the one or more access commands of the second portion of the set of access commands.

19. The non-transitory computer-readable medium of claim 17, wherein the instructions, when executed by the processor of the electronic device, further cause the electronic device to fetch a portion of a logical to physical table associated with logical addresses accessed by the sequence before receiving the second portion of the set of access commands based at least in part on identifying the receipt of the first portion of the set of access commands as starting the second instance of the sequence of access commands.

20. The non-transitory computer-readable medium of claim 17, wherein the instructions, when executed by the processor of the electronic device, further cause the electronic device to compare the first portion of the set of access commands of the second instance of the sequence with the set of access commands of the first instance of the sequence, wherein the electronic device is configured to identify the first portion of the set of access commands as starting the second instance of the sequence based at least in part on the comparison.

21. The non-transitory computer-readable medium of claim 17, wherein the instructions, when executed by the processor of the electronic device, further cause the electronic device to update a value in a register from a first value to a second value based at least in part on storing the sequence, wherein the value indicates a quantity of sequences stored at the electronic device.

22. The non-transitory computer-readable medium of claim 17, wherein the instructions, when executed by the processor of the electronic device, further cause the electronic device to:
identify a first power state for the electronic device between a first access command of the set of access commands and a second access command of the set of access commands based at least in part on receiving the set of access commands; and
store the first power state with the sequence based at least in part on identifying the first power state.

23. The non-transitory computer-readable medium of claim 22, wherein the instructions, when executed by the processor of the electronic device, further cause the electronic device to:
identify a third access command of the first portion of the set of access commands corresponding to the first access command of the set of access commands based at least in part on storing the sequence and receiving the first portion of the set of access commands; and
transition from a second power state to the first power state based at least in part on identifying the third access command corresponding to the first access command.

24. A non-transitory computer-readable medium storing code comprising instructions, which when executed by a processor of an electronic device, cause the electronic device to:
receive, at a controller, a first command indicating a start of a first instance of a sequence of access commands to store at the controller, wherein the sequence is associated with a set of data stored at a memory array comprising a plurality of memory cells;
receive a plurality of access commands after receiving the first command, the plurality of access commands associated with the first instance of the sequence and the plurality of access commands comprising an access command associated with a first portion of the set of data and an access command associated with a second portion of the set of data, wherein the first instance of the sequence of access commands comprises the plurality of access commands;
receive a second command indicating an end of the first instance of the sequence after receiving the plurality of access commands; and
transfer the first portion of the set of data from a first location to a second location based at least in part on receiving the second command, wherein, at the second location, an operation associated with the access command associated with the first portion of the set of data is executed concurrently with an operation associated with the access command associated with the second portion of the set of data.

25. The non-transitory computer-readable medium of claim 24, wherein the instructions, when executed by the processor of the electronic device, further cause the electronic device to:
receive a second plurality of access commands after transferring first portion of the set of data to the second location, the second plurality of access commands comprising a first access command associated with the first portion of the set of data and a second access command associated with the second portion of the set of data; and
execute the second plurality of access commands at the second location based at least in part on receiving the second plurality of access commands, wherein the second plurality of access commands are associated with a second instance of the sequence, and wherein an operation for the first access command and an operation for the second access command are executed concurrently.

* * * * *